(No Model.)  2 Sheets—Sheet 1.
W. W. REYNOLDS.
FOLDING PLATFORM SCALE.
No. 316,178. Patented Apr. 21, 1885.
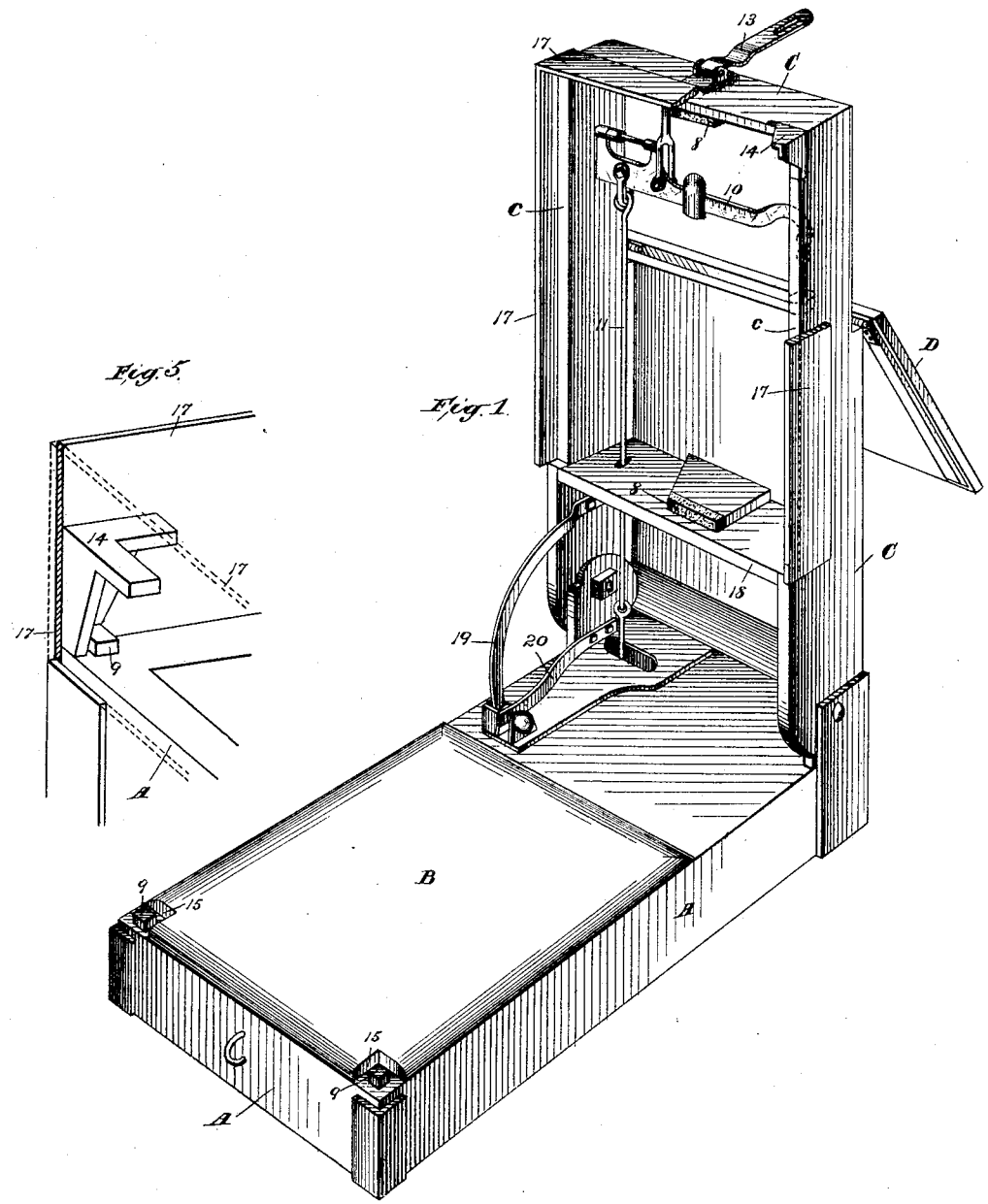

(No Model.) 2 Sheets—Sheet 2.
W. W. REYNOLDS.
FOLDING PLATFORM SCALE.
No. 316,178. Patented Apr. 21, 1885.
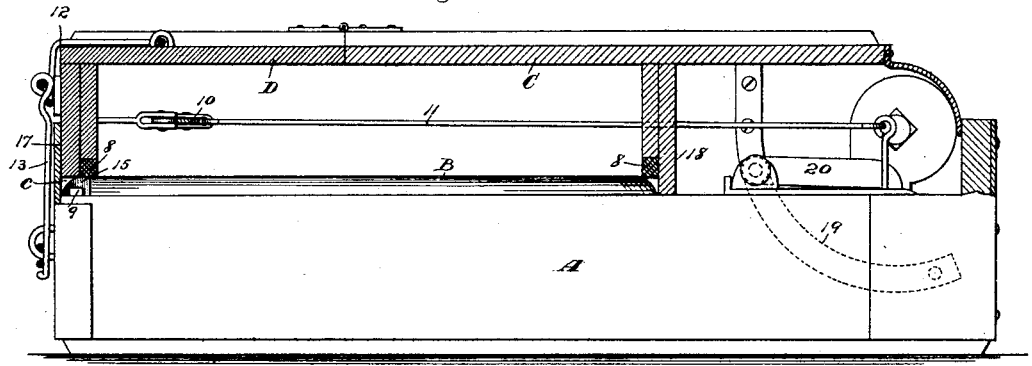
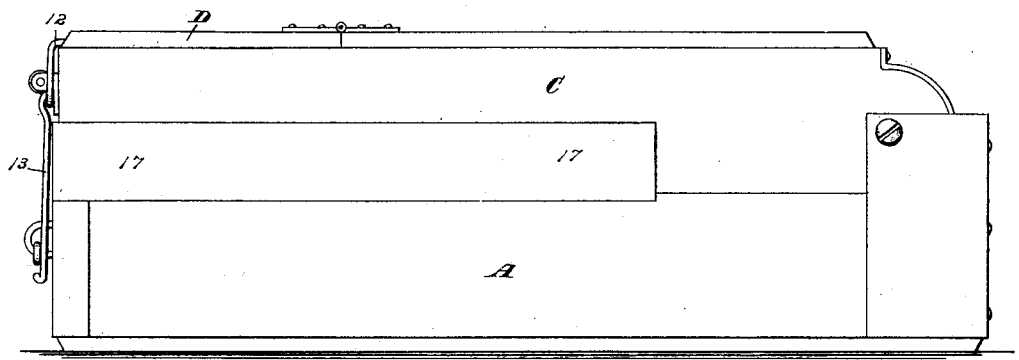
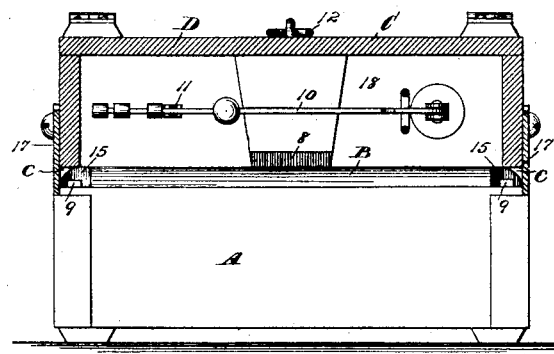
Attest:
Geo. H. Botts,
J. A. Hovey
Inventor:
William W. Reynolds
by Munn & Phieff
attys.

UNITED STATES PATENT OFFICE.

WILLIAM W. REYNOLDS, OF RUTLAND, VERMONT.

FOLDING PLATFORM-SCALE.

SPECIFICATION forming part of Letters Patent No. 316,178, dated April 21, 1885.

Application filed January 6, 1885. (No model.)

*To all whom it may concern:*

Be it known that I, WILLIAM W. REYNOLDS, a citizen of the United States, residing at Rutland, county of Rutland, and State of Vermont, have invented certain new and useful Improvements in Folding Platform-Scales, fully described and represented in the following specification and the accompanying drawings, forming a part of the same.

This invention relates, generally, to that class of weighing-scales which are known as "platform-scales," but more particularly to those scales of that class in which the upright portion, which carries the weighing-beam, is hinged to the horizontal portion or base, which carries the platform, in such manner that when the scale is not in use the two can be folded together, so as to bring the scale into very compact and convenient form for handling, storage, or transportation.

In these folding scales as commonly constructed the levers which support the platform are inclosed within a rectangular casing or box, which forms the base of the scale, while the weighing-beam and adjacent parts are inclosed within a similar casing or box, which is hinged to the base and so arranged that it can be turned up into a vertical position at right angles to the base when the scale is to be used or down into a horizontal position, so as to lie flat upon the top of the base, and not only reduce the size of the scale, but, at the same time, form a cover which incloses and protects the platform and all the other exposed parts when the scale is not in use or is to be stored or shipped.

In the scales of this class as heretofore constructed the casing which contained the scale-beam, or what, when the scale was folded, became the cover portion, has been so constructed that, when closed down, its edges rested upon the edges of the base around the outside of the platform, and in order to permit the cover to close down onto the base in this manner it was necessary that the base should be made to extend considerably beyond the platform on all sides. In weighing articles of a rigid nature or inclosed in rigid packages this feature was not particularly objectionable; but in weighing articles of a flexible nature or inclosed in flexible packages, and which were not capable of sustaining themselves in a horizontal position—such, for example, as grain or similar substances in sacks or similar packages—this feature of construction was highly objectionable, as the article being weighed was liable to settle or bend over the edges of the platform, so as to come into contact with the base, and thus, unless great care was taken, cause the scale to weigh inaccurately. This has been a very serious objection to this class of scales, and has prevented them from being put into more general use.

It is the object of the present invention to overcome this difficulty; and to that end the invention consists in the various details of construction, which will now be fully explained and particularly pointed out, reference being had to the accompanying drawings, in which—

Figure 1 is a perspective view, certain parts being partially broken away, of a platform-scale embodying the invention, the cover portion being shown in its raised position and the scale in condition ready for use. Fig. 2 is a side elevation of the same, showing the covered portion folded down onto the base. Fig. 3 is a similar view showing the cover portion in section. Fig. 4 is an end elevation showing the cover portion in section; and Fig. 5 is a perspective view upon an enlarged scale showing a detail, which will be hereinafter referred to.

Referring to said drawings, it is to be understood that the scale therein shown is, as to its general construction, substantially the same as that shown in my former Letters Patent No. 226,000, consisting of a rectangular casing or box, A, which forms the base of the scale, and within which is arranged the usual system of levers for supporting the platform B, and a similar casing or box, C, which is hinged to the base and arranged to fold down to form a cover for the same, and from the top or outer end of which is suspended the scale-beam 10, the short arm of which is connected by a rod, 11, with the levers which support the platform B. The cover portion C is provided at its back with the usual hinged door, D, which can be let down when the cover is raised to its vertical position, so as to afford ready access to the beam 10; and this door and the cover portion C are provided with the usual hasps, 12 13, by which the door can be fastened in its closed position and the cover secured to the base when the two are folded together.

The platform B, instead of being of less size than the base A, so that the latter extends beyond the edges of the former, as in the construction shown in my prior Letters Patent, is made of such size that its sides and outer end lie just flush with the sides and end of the base A, thereby avoiding all liability of having any article which is being weighed come into contact with the base, and thus destroy the accuracy of the weight.

In order to allow the platform to extend outward to a position flush with the edges of the base, the sides and end of the cover portion C are cut away, as shown at c, so as to allow the platform to project between the cover and base when the former is closed down, as shown in Figs. 3 and 4; and to hold the cover portion securely in position against lateral displacement when it is turned down it is provided at its upper or outer corners with two projections or legs, 14, which pass through small recesses or openings 15 in the corners of the platform and rest upon the base. The ends of the legs 14 which rest upon the base are made in the form of ordinary angle-iron, and the base is provided with two projections or studs, 9, which fit into the angles of the legs, as shown in Fig. 5, when the cover is closed down so as to prevent the legs from moving laterally upon the platform. In addition to preventing the cover from moving laterally after it has been closed down and secured to the base, the legs 14 also engage with the sides of the recesses or openings 15, and thus prevent the platform from having any lateral movement.

It is to be remarked in passing that the base A, instead of being provided with the studs 9, may be provided with openings into which the legs 14 will fit, and such openings will perform the same function as the studs, and are to be considered the equivalent thereof. In such case the legs of course will be made slightly longer.

In order to still further provide for holding the platform securely against lateral displacement or injury, the sides and end of the cover portion C are provided with strips or bands 17 of iron, which are secured to the outside of the cover portion, so as to cover the cut-away portions c, and are made of sufficient width to extend below the cover and overlap onto the base A, as shown. The bands 17 also serve to prevent any dirt or other matter from entering the casing.

The cover portion C is provided with the usual cross-partition, 18, which closes down onto the base at the inner end of the platform, and this partition and the upper or outer end of the cover C are provided with the usual rubber buffers, 8, which press upon the top of the platform when the cover is closed down, and thus prevent the platform from being raised from its seat by any shock or jar which the scale may receive in handling.

The scale may be provided with a quadrant, 19, and spring-catch 20, similar to that shown in my prior Letters Patent, before referred to, for holding the cover in its vertical position while the scale is in use. The scale may also, if desired, be provided with the devices shown in my said Letters Patent for raising and holding the beam 10 away from its knife-edge pivots when the cover is closed down.

What I claim is—

1. The combination, with the base A, provided with the platform B, extending outward to the edges of the base and having the recesses or openings 15, of the cover C, cut away at c and provided with the legs 14, substantially as described.

2. The combination, with the base A, provided with the studs 9, the platform B, extending outward to the edges of the base and having the recesses or openings 15, of the cover C, cut away at c and provided with the legs 14, substantially as described.

3. The combination, with the base A, provided with the platform B, extending outward to the edges of the base and having the recesses or openings 15, of the cover C, cut away at c and provided with the legs 14 and the bands 17, substantially as described.

In testimony whereof I have hereunto set my hand in the presence of two subscribing witnesses.

WM. W. REYNOLDS.

Witnesses:
 WARREN H. SMITH,
 G. H. CHENEY.